(12) United States Patent
Elisha

(10) Patent No.: US 10,142,173 B2
(45) Date of Patent: Nov. 27, 2018

(54) AUTOMATED CREATION OF PRIVATE VIRTUAL NETWORKS IN A SERVICE PROVIDER NETWORK

(71) Applicant: Amazon Technologies, Inc., Seattle, WA (US)

(72) Inventor: Simon Jeremy Elisha, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 122 days.

(21) Appl. No.: 13/872,725

(22) Filed: Apr. 29, 2013

(65) Prior Publication Data

US 2014/0325037 A1     Oct. 30, 2014

(51) Int. Cl.
*G06F 15/177*   (2006.01)
*H04L 12/24*    (2006.01)

(52) U.S. Cl.
CPC ...... *H04L 41/0806* (2013.01); *H04L 41/0843* (2013.01); *H04L 41/0853* (2013.01); *H04L 41/22* (2013.01)

(58) Field of Classification Search
CPC ............. H04L 41/0806; H04L 41/0843; H04L 41/0853; H04L 41/22
USPC ................................ 709/217, 220, 223, 227
See application file for complete search history.

(56) References Cited

U.S. PATENT DOCUMENTS

| | | | |
|---|---|---|---|
| 7,698,398 B1 | 4/2010 | Lai | |
| 7,953,865 B1 * | 5/2011 | Miller | ................. H04L 12/6418 370/254 |
| 8,417,938 B1 | 4/2013 | Considine et al. | |
| 2003/0041136 A1 | 2/2003 | Cheline et al. | |
| 2003/0135596 A1 | 7/2003 | Moyer et al. | |
| 2005/0138204 A1 * | 6/2005 | Iyer | ..................... H04L 12/4641 709/242 |
| 2012/0131579 A1 | 5/2012 | Pujolle et al. | |
| 2013/0018994 A1 * | 1/2013 | Flavel | ................. H04L 41/0806 709/220 |
| 2013/0166504 A1 * | 6/2013 | Varkhedi et al. | ............. 707/610 |

(Continued)

FOREIGN PATENT DOCUMENTS

| | | |
|---|---|---|
| JP | H08328984 | 12/1996 |
| JP | 2002185512 | 6/2002 |
| WO | WO20121010092 | 7/2012 |

OTHER PUBLICATIONS

PCT Search Report and Written Opinion dated Sep. 25, 2014 for PCT Application No. PCT/US14/35714, 7 Pages.

(Continued)

*Primary Examiner* — Joseph E Avellino
(74) *Attorney, Agent, or Firm* — Lee & Hayes, PLLC

(57) ABSTRACT

Data may be collected regarding the configuration of a network, such as a customer network operated by a customer of a service provider operating a service provider network. An appropriate interface, such as a user interface, may be provided to allow a user to add, delete, or otherwise modify the collected network configuration data. The collected, and possibly modified, network configuration data may then be utilized to create a private virtual network in the service provider network. The private virtual network may be implemented such that it has the same, or similar, network configuration as the customer network.

18 Claims, 7 Drawing Sheets

(56) References Cited

U.S. PATENT DOCUMENTS

2013/0166705 A1* 6/2013 Flavel ................ H04L 41/0806
709/220
2013/0297800 A1* 11/2013 Considine ............. G06F 9/5088
709/226

OTHER PUBLICATIONS

Extended EP Search Report dated Aug. 26, 2016 for European patent application No. 14791253.9, 8 pages.
Chinese Office Action dated Apr. 19, 2017 for Chinese Patent Application No. 201480024131.1, a counterpart foreign application of U.S. Appl. No. 13/872,725.
Translated Japanese Office Action dated Nov. 15, 2016 for Japanese Patent Application No. 2016-510825, a counterpart foreign application of U.S. Appl. No. 13/872,725, 6 pages.

* cited by examiner

AUTOMATED CREATION OF PRIVATE VIRTUAL NETWORKS IN A SERVICE PROVIDER NETWORK

BACKGROUND

Some network-based computing service providers allow customers to purchase and utilize computing resources, such as virtual machine instances, on a permanent or as-needed basis. In addition to virtual machine instances, such computing service providers typically allow customers to purchase and utilize other types of computing resources. For example, customers might be permitted to purchase access to and use of file and block data storage resources, database resources, networking resources, and other types of computing resources. Utilizing these computing resources as building blocks, customers of such a network-based computing service can create custom solutions that provide various types of functionality, such as application hosting, backup and storage, content delivery, World Wide Web ("Web") hosting, enterprise information technology ("IT") solutions, database services, and others.

It can sometimes be difficult for customers, or potential customers, of service providers such as those described above to migrate their existing networks and computing resources into a network-based computing service. For example, a significant amount of manual technical effort may be required to configure services provided by a service provider network to duplicate functionality implemented by a customer network and the computing resources on the customer network. The technical effort required to migrate to a service provider network may be costly and time consuming and might, therefore, present a significant barrier to the utilization of network-based computing services to certain types of customers.

The disclosure made herein is presented with respect to these and other considerations.

DETAILED DESCRIPTION

Figure 1:
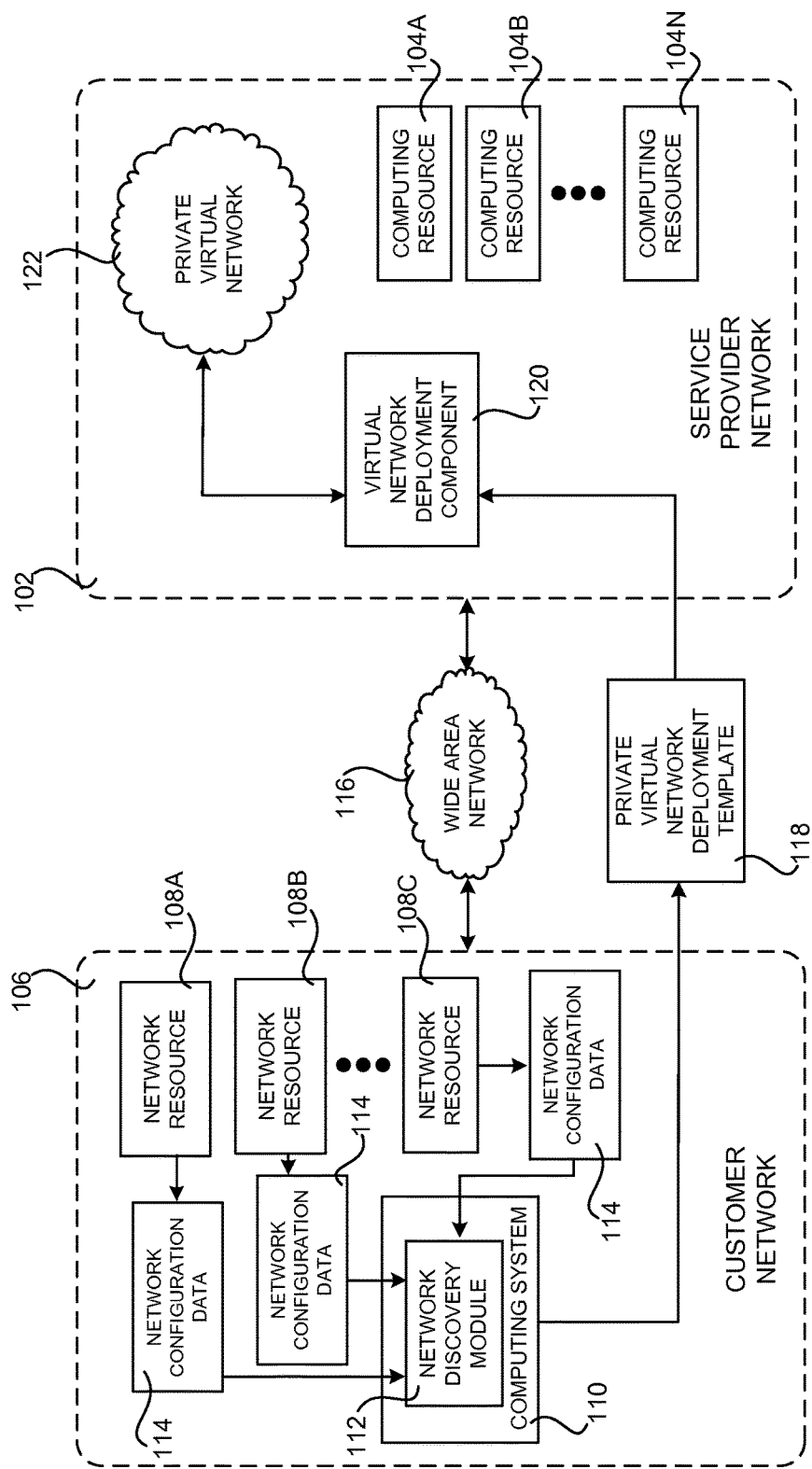
FIG. 1 is a network architecture diagram showing aspects of one illustrative mechanism described herein for automated creation of private virtual networks in a service provider network, according to one embodiment disclosed herein.

The following detailed description is directed to technologies for automated creation of private virtual networks ("PVNs") in a service provider network. A PVN is a logical network in a network provided by a network-based computing service provider that is privately accessible by a particular customer of the service provider. A service provider may implement the PVN using various network virtualization technologies.

Utilizing the technologies described herein, a customer of a network-based computing service provider can quickly and easily create a PVN in a service provider network that duplicates some or all of the functionality provided by another network operated by the customer (referred to herein as a "customer network"). In this way, the customer can be freed from the previously difficult task of manually configuring functionality provided by the customer network in the service provider network.

According to embodiments presented herein, computer-implemented mechanisms are disclosed for automated creation of PVNs in a service provider network. The mechanisms disclosed herein might operate in conjunction with a service provider operated network-based distributed computing environment (which may be referred to herein as a "service provider network") through which customers can purchase and utilize computing resources, such as virtual machine instances, data storage resources, database resources, networking resources such as PVNs, and other types of computing resources on a permanent or as-needed basis.

The service provider may charge a fee for operating the computing resources to the customer that creates and uses the resources. The service provider might also utilize various purchasing models to determine how much to charge the customer for the use of computing resources provided by the service provider. As mentioned above, customers of such a service provider can utilize the computing resources as building blocks to create custom solutions that provide various types of functionality, such as application hosting, backup and storage, content delivery, Web hosting, enterprise IT solutions, database services, and others.

As also mentioned above, it might be difficult for a customer of a computing service provider to configure components and services provided by a service provider network to duplicate functionality implemented by a customer network and any computing resources on the customer network. For example, a customer might operate physical server computers, database servers, and data storage devices in an on-premises customer network (i.e. a network operated by the customer at a physical location owned and/or operated by the customer). The customer might be interested in migrating the functionality provided by some or all of these computing resources into a service provider network. It might, however, be difficult for the customer to duplicate functionality provided by the customer network in the service provider network. The various embodiments disclosed herein address these and potentially other considerations.

In order to address at least some of the considerations set forth above, the embodiments disclosed herein provide a computer-implemented mechanism for automated creation of PVNs in a service provider network. In one particular implementation, the mechanism includes a network discovery module. The network discovery module may be implemented as a software component configured to execute on a computing system operating in a customer network. For example, the network discovery module might execute on a physical server computer or on a virtual machine instance operating in the customer network. A specific-purpose hardware device might also be utilized to provide the functionality disclosed herein as being provided by the network discovery module.

The network discovery module is configured to collect data defining the configuration of a network, such as a customer network. In order to provide this functionality, the network discovery module might utilize appropriate protocols to access management interfaces provided by network resources on the network. For example, the network discovery module might utilize the Simple Network Management Protocol ("SNMP") to access network resources on the network and obtain network configuration data. Other types of mechanisms might also be utilized to obtain network configuration data from network resources on the network. Network resources include, but are not limited to, network switches, network routers, load balancing devices, network firewalls, network management systems, and others.

The network configuration data collected by the network discovery module might include any type of data that defines aspects of the configuration of a network. For example, and without limitation, the network configuration data might include data defining a network address space utilized by the customer network, data defining one or more subnets in the customer network, data defining one or more network access control lists ("ACLs") existing in the customer network, data defining one or more routing rules existing in the customer network, data defining one or more network address translation ("NAT") instances existing in the customer network, data defining firewalls in the customer network, and data defining one or more Internet gateway devices existing in the customer network. The network discovery module might also collect other types of network configuration data from other types of network devices.

Once the network configuration data describing the configuration of a network has been collected, the network discovery module might also provide an appropriate interface, such as a user interface ("UI"), through which a user can modify the collected network configuration data. For example, and without limitation, a user might be permitted to select a subset or a superset of the identified network resources in the network for inclusion in the PVN in the service provider network. In particular, if the network includes any subnetworks ("subnets"), the user might be able to select the subnets that are to be included in the PVN to be created in the service provider network. In this way, the user might be permitted to select a subset of the subnets for inclusion in the PVN in the service provider network. Other types of interfaces, such as APIs or command line interfaces might also be provided through which a user can modify the collected network configuration data.

The user might also be permitted to utilize the UI to specify network addresses utilized by the PVN in the service provider network. In some implementations, the UI might also be configured to provide a recommendation of network addresses for use by the PVN in the service provider network. As an example, the UI might recommend network addresses for the PVN that do not overlap, or otherwise conflict with, network addresses utilized within the customer network.

The UI might also provide functionality for modifying the network configuration data in other ways. For example, a user might be permitted to add, delete, or modify NAT instances, network ACLs, routing rules, firewalls, Internet gateways, load balancing devices, and/or other networking resources. The UI might also be permitted to allow a user to modify the network configuration data in other ways not specifically mentioned herein. Additionally, interfaces other than UIs might also be provided for modifying the network configuration data.

Once the user has completed the modifications to the network configuration data, if any, the network configuration data may be utilized to create a PVN deployment template. The PVN deployment template includes data describing the configuration of a PVN to be created in the service provider network. For example, and without limitation, the PVN deployment template might specify network addresses to be utilized by a PVN, subnets in the PVN, network ACLs to be used in the PVN, routing rules to be used in the PVN, NAT instances to be implemented in the PVN, Internet gateways and/or firewalls to be implemented in the PVN, and/or other types of information defining the manner in which the PVN is to be implemented in the service provider network.

The network discovery module creates the PVN deployment template in one embodiment. Another component, such as a component in the service provider network, may utilize the collected network configuration data to create the PVN deployment template in other embodiments. In some implementations, the network configuration data might be utilized directly to create a PVN in the service provider network without creating the PVN deployment template.

A component within the service provider network, such as a virtual network deployment component, may utilize the PVN deployment template to instantiate a PVN in the service provider network. Alternately, the virtual network deployment component might utilize the network configuration data directly to instantiate the PVN in the service provider network. Depending upon the modifications made to the network configuration data by the user, the PVN may be created with a configuration that is the same as, or similar to, the configuration of the customer network. In this way, the customer can be freed from the previously difficult task of manually configuring functionality provided by the customer network in a PVN provided by the service provider network.

Once the PVN has been created, the customer can begin adding computing resources to the PVN, such as virtual machine instances and other types of computing resources. Additional details regarding the various components and processes described above for automated creation of private virtual networks in a service provider network will be presented below with regard to FIGS. 1-7.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. As mentioned briefly above, the embodiments described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures (which may be referred to herein as a "FIG." or "FIGS.").

FIG. 1 is a network architecture diagram showing aspects of one illustrative mechanism described herein for automated creation of PVNs in a service provider network. As described briefly above, the various mechanisms disclosed herein might operate in conjunction with a service provider network 102, in which customers can purchase and utilize computing resources 104A-104N (which may be referred to herein as "resources 104"), such as virtual machine instances, networking resources, storage resources, or other types of computing resources, from a service provider on a permanent or as-needed basis.

Each type or configuration of a computing resource 104 may be available from the service provider that operates the service provider network 102 in different sizes. For example, a service provider might offer virtual machine instances or other types of data processing resources that are available for purchase and use that have many different configurations of processor capabilities, main memory, disk storage, and operating system. A service provider might also offer other types of resources 104 for purchase and use by customers. For example, a service provider might offer database resources, file or block data storage resources, and/or networking resources, such as load balancing resources, domain name service ("DNS") resources, and virtual networking resources such as the PVNs described herein, and/or other types of resources on a permanent or as-needed basis.

The service provider operating a service provider network 102 might also charge a fee for operating the resources 104 to the customer that creates and uses the resources 104. The fee charged for a particular resource 104 might be based upon the type and/or configuration of the resource 104. The fee charged for a particular resource 104 might also be based upon the amount of time the resource 104 is utilized. For example, in the case of a data processing resource, like a virtual machine instance, the fee for use of the resource might be charged based upon the amount of time the resource is utilized. In the case of a data storage resource 104, the fee might be computed based upon the amount of data stored and/or the amount of data transferred into or out of the resource. The fees for other types of resources 104 might also be based upon other considerations. A service provider might also utilize various purchasing models to determine the amount to charge a customer for use of resources 104 provided by the service provider.

The resources 104 described above may be provided in one particular implementation by one or more data centers operated by the service provider. As known to those skilled in the art, data centers are facilities utilized to house and operate computer systems and associated components. Data centers also typically include redundant and backup power, communications, cooling, and security systems. The data centers might be located in geographically disparate locations, and might also be connected to various other facilities, such as co-location facilities, and various wide area networks ("WANs") 116, such as the Internet. In the environment shown in FIG. 1, a service provider might operate one or more data centers configured to provide the resources 104 in the service provider network 102 to its customers. Details regarding the implementation of a service provider network 102 for providing the functionality disclosed herein will be provided below with regard to FIGS. 5 and 6.

The various resources 104 described above might also be provisioned and de-provisioned as needed in an automated fashion. For example, a customer might submit a request to the service provider network 102 to instantiate a new instance of a computing resource 104, such as an instance of a virtual machine. In response to receiving such a request, a provisioning component (not shown in FIG. 1), or one or more other components within the service provider network 102, might create the new instance of the virtual machine as requested by the customer. The customer may then be permitted to utilize the new instance of the virtual machine as desired. Other types of computing resources might be instantiated in a similar fashion. For example, and as will be described in greater detail below, the virtual network deployment component 120 is a component in the service provider network 102 that is configured to deploy networking resources, such as PVNs.

When a customer has finished using a computing resource 104, such as a virtual machine instance, the customer may request that the resource 104 be de-provisioned. In response thereto, the provisioning component, or another component in the service provider network 102, may cause the computing resources 104 to be de-provisioned. Other types of computing resources 104 might also be provisioned and de-provisioned in a similar manner. The service provider network 102 might also provide functionality for automatically scaling and/or de-scaling resources 104 based upon demand for the computing resources 104 or other factors.

As shown in FIG. 1, a customer or potential customer of the service provider operating the service provider network 102 might operate a customer network 106 that also includes one or more computing resources. As with the computing resources 104 in the service provider network 102, the computing resources in a customer network 106 might include data processing resources, data storage resources, database resources, networking resources 108A-108C, and other types of computing resources. The networking resources 108A-108C might include network components such as network switches, network routers, network firewalls, and other types of network components.

In some embodiments, the customer network 106 is an on-premises customer network. As mentioned briefly above, an on-premises customer network is a network operated by a customer at a physical location owned and/or operated by the customer. For example, a customer might operate the customer network 106 in their office or other facility. The customer network 106 might also be implemented in a service provider network 102 that is provided by a service provider in the manner described above in other embodiments.

As mentioned above, it might be difficult for the customer of a computing service provider to migrate functionality provided by the customer network 106 into the service provider network 102. For instance, in the example shown in FIG. 1, a customer might be interested in migrating the functionality provided by computing resources operating in the customer network 106 into a service provider network 102. It might be difficult, however, for the customer to configure and create a PVN 122 in the service provider network 102 that provides the functionality provided by the network resources 108A-108C in the customer network 106.

In order to assist a potential customer of a computing service provider in migrating to the service provider network 102, the embodiments presented herein utilize a network discovery module 112. As mentioned briefly above, the network discovery module 112 might be implemented as a software component configured to execute on a computing system 110 in the customer network 106, such as a physical computer or a virtual machine instance. In some embodiments, the network discovery module 112 might be executed on a computing system in a service provider network 102.

When the customer network 106 is implemented using a service provider network 102, the network discovery module 112 might also be executed on computing resources 104 in the service provider network 102. Executing the network discovery module 112 on computing resources 104 in a service provider network 102 may be desirable, for instance, when a customer is considering switching from one service provider to another service provider.

Functionality provided by the network discovery module 112 might also be implemented in hardware, in a combination of hardware and software, or in another manner. The network discovery module 112 might be configured to execute in the background and to utilize minimal computing resources. In this way, execution of the network discovery module 112 will not impact other processes executing on the same computing system 110. The network discovery module 112 might also be configured to execute in a distributed manner across many computing systems.

As discussed briefly above, the network discovery module 112 is configured to collect network configuration data 114 from the network resources 108A-108C that implement the customer network 106. The network resources 108A-108C include, but are not limited to, network switches, network routers, network firewalls, network management systems, load balancing devices, and other types of networking components. The network configuration data 114 defines aspects of the configuration of the customer network 106.

In order to obtain the network configuration data 114, the network discovery module 112 might utilize appropriate protocols to access management interfaces provided by network resources 108A-108C on the customer network 106. For example, the network discovery module 112 might utilize SNMP or another suitable protocol to access network resources 108A-108C on the customer network 106 and obtain the network configuration data 114. The network discovery module 112 might also utilize other types of mechanisms, such as but not limited to API calls, command line calls, and the proprietary management ports of hardware devices, to obtain network configuration data 114 from network resources 108A-108C on the customer network 106. In some implementations, the network discovery module 112 is configured to utilize plug-in program modules configured to interface with and retrieve network configuration data 114 from network devices created by various manufacturers.

The network configuration data 114 collected by the network discovery module 112 might include any type of data that defines aspects of the configuration of a network, such as the customer network 106. For example, and without limitation, the network configuration data 114 might include data defining a network address space utilized by the customer network 106, data defining one or more subnets in the customer network 106, data defining one or more network ACLs existing in the customer network 106, data defining one or more routing rules existing in the customer network 106, data defining one or more NAT instances existing in the customer network 106, data defining firewalls in the customer network 106, data defining one or more load balancing devices in the customer network 106, and data defining one or more Internet gateway devices existing in the customer network 106. The network discovery module 112 might also collect other types of network configuration data 114 from other types of network devices not specifically mentioned herein.

Once the network configuration data 114 describing the configuration of the customer network 106 has been collected, the network discovery module 112 might also provide an appropriate interface, such as a UI, through which a user can view and modify the collected network configuration data 114. For example, the UI might display the collected network configuration data 114. In particular, the UI might present a list of the subnets identified in the customer network 106, the network ACLs used in the customer network 106, the Classless Inter-Domain Routing ("CIDR") ranges used in the customer network 106, any NAT instances or Internet gateway devices in the customer network 106, and/or other types of network configuration data 114.

The UI might also provide functionality for allowing a user to select a subset or a superset of the identified network resources 108A-108C in the customer network 106 for inclusion in the PVN 122 in the service provider network 102. In particular, if the customer network 106 includes any subnets, a user might be permitted to select the subnets that are to be included in the PVN 122 to be created in the service provider network 102. In this way, the user might be permitted to select a subset of the subnets for inclusion in the PVN 122 in the service provider network 102. In a similar fashion, the UI might also provide functionality for selecting other types of network resources 108A-108C for inclusion in, or exclusion from, the PVN 122 to be created in the customer network 102.

A user might also be permitted to utilize the UI or other type of interface provided by the network discovery module 112 to change and/or specify network addresses utilized by the PVN 122 to be created in the service provider network 102. In some implementations, the interface might also be configured to provide a recommendation of network addresses for use by the PVN 122 in the service provider network 102. As an example, a UI might recommend network addresses for the PVN 122 or subnets within the PVN 122 that do not overlap, or otherwise conflict with, network addresses utilized within the customer network 106.

The UI might also provide functionality for modifying the network configuration data 114 in other ways. For example, a user might be permitted to add, delete, or modify NAT instances, load balancing devices, network ACLs, routing rules, firewalls, Internet gateways, and/or other networking resources 108 to the network configuration data 114. The UI might also be permitted to allow a user to modify the network configuration data 114 in other ways not specifically mentioned herein. Additionally, interfaces other than UIs might also be provided for modifying the network configuration data.

In some embodiments, the UI described above is provided by a component in the service provider network 102. For example, the network discovery module 112 might transmit the collected network configuration data 114 to a component in the service provider network 102. That component might then provide an appropriate UI or other type of interface for modifying the network configuration data 114 in the manner described above and/or in other ways. Other components in other networks might also be utilized to modify the collected network configuration data 114.

Once the user has completed the modifications to the network configuration data 114, if any, the network configuration data 114 may be utilized to create a PVN deployment template 118 in one embodiment. The PVN deployment template 118 includes data describing the configuration of a PVN 122 to be created in the service provider network 102. For example, and without limitation, the PVN deployment template 118 might specify network addresses to be utilized by a PVN 122, subnets in the PVN 122, network ACLs to be used in the PVN 122, routing rules to be used in the PVN 122, NAT instances to be implemented in the PVN 122, Internet gateways and/or firewalls to be implemented in the PVN 122, and/or other types of information defining the manner in which the PVN 122 is to be implemented in the service provider network 102. The PVN deployment template 118 might be implemented utilizing JavaScript Object Notation ("JSON") or in another suitable language. The PVN deployment template 118 might be defined such that the created PVN 122 in the service provider network 102 has a configuration that is the same as, or similar to, the configuration of the customer network 106.

In one embodiment, the network discovery module 112 creates the PVN deployment template 118. In another embodiment, a different component, such as a component in the service provider network 102, may utilize the collected network configuration data 114 to create the PVN deployment template 118. Moreover, in some implementations a PVN deployment template 118 might not be created. In these implementations, the collected network configuration data 114 might be utilized directly to create a PVN 122 in the service provider network 102 without first creating the PVN deployment template 118.

A component within the service provider network 102, such as a virtual network deployment component 120 in one embodiment, may utilize the PVN deployment template 118 to instantiate a PVN 122 in the service provider network 102. Alternately, the virtual network deployment component 120 might utilize the network configuration data 114 directly to instantiate the PVN 122 in the service provider network 102. Depending upon the modifications made to the network configuration data 114 by a user, the PVN 122 may be created with a configuration that is the same as, or similar to, the configuration of the customer network 106. In this way, the customer operating the customer network 106 can be freed from the previously difficult task of manually configuring functionality provided by the customer network in a PVN 122 provided by the service provider network 102.

Once the PVN 122 has been created, the customer can begin adding computing resources 104 to the PVN 122, such as virtual machine instances and other types of computing resources 104. Additional details regarding the various components and processes described above for automated creation of a PVN 122 in a service provider network 102 will be presented below with regard to FIGS. 2-7.

Figure 2:
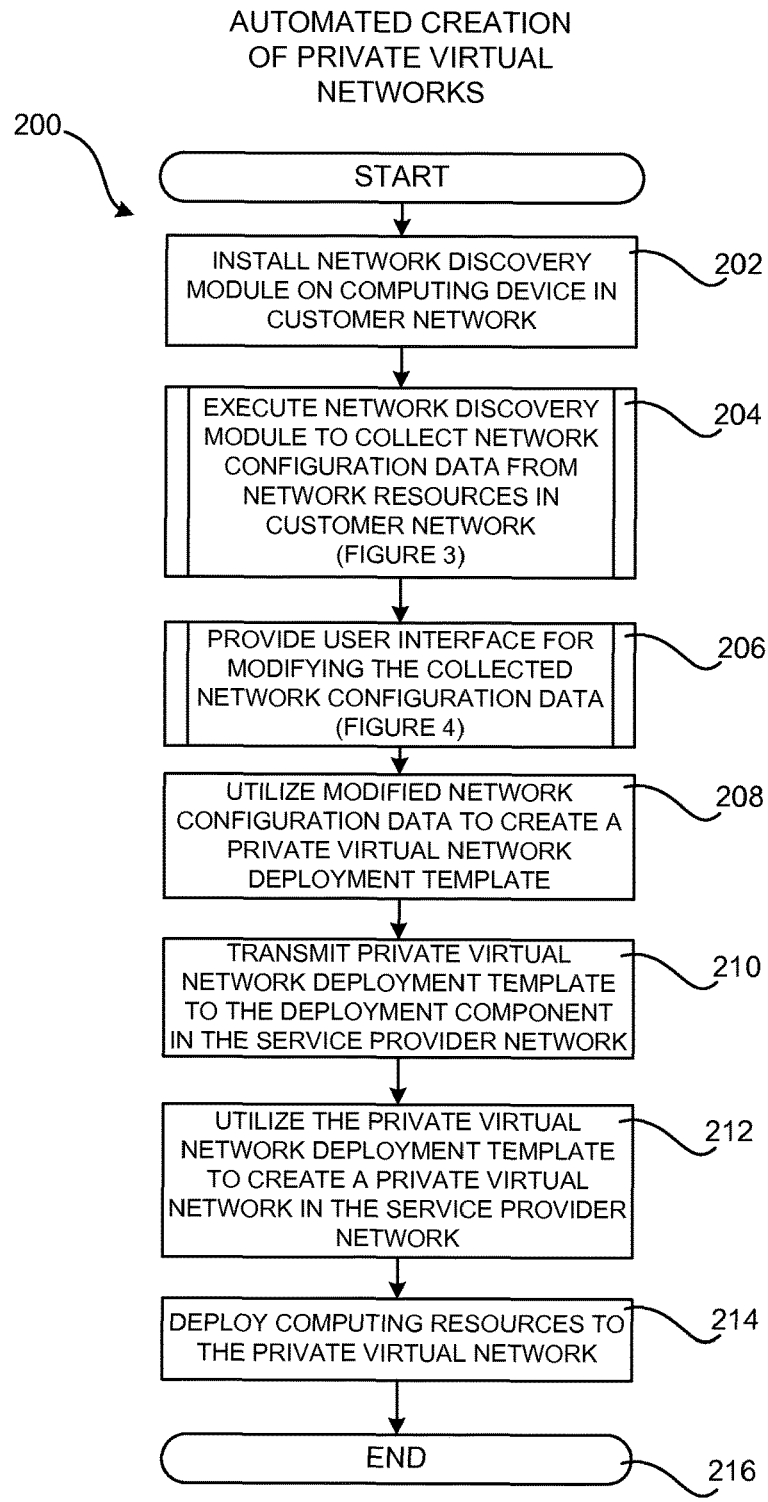
FIG. 2 is a flow diagram showing one illustrative routine for automated creation of private virtual networks in a service provider network, according to one embodiment disclosed herein.

FIG. 2 is a flow diagram showing one illustrative routine 200 for automated creation of a PVN 122 in a service provider network 102, according to one embodiment disclosed herein. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

The routine 200 begins at operation 202, where the network discovery module 112 is installed on at least one computing system 110 in the customer network 106. For example, and as described above, the network discovery module 112 might be installed on a physical computer or a virtual machine connected to the customer network 106. Once the network discovery module 112 has been installed on a computing system 110 connected to the customer network 106, the routine 200 proceeds to operation 204.

At operation 204, the network discovery module 112 is executed in order to collect the network configuration data 114 from the various network resources 108A-108C on the customer network 106. As mentioned above, the network discovery module 112 might access various management interfaces exposed by the network resources 108A-108C to obtain the network configuration data 114. Additional details regarding this process will be provided below with regard to FIG. 3.

From operation 204, the routine 200 proceeds to operation 206, where the network discovery module 112, or another component, provides a UI or other type of interface for displaying the collected network configuration data 114 and for permitting a user to modify the collected network configuration data 114. Details regarding the various types of modifications that might be made through such an interface are provided below with regard to FIG. 4.

From operation 206, the routine 200 proceeds to operation 208, where the network configuration data 114 is utilized to create a PVN deployment template 118. As mentioned above, the PVN deployment template 118 includes data describing the configuration of the PVN 122 to be created in the service provider network 102. As also mentioned above, a PVN deployment template 118 might not be created in every implementation. Rather, in some implementations, the collected and potentially modified network configuration data 114 might be utilized directly to configured the PVN 122 in the service provider network 102.

From operation 210, the network discovery module 112 transmits the PVN deployment template 118 to the virtual network deployment component 120 in the service provider network 102. In some embodiments, the PVN deployment template 118 might be created by a service or other component within the service provider network 102. In these embodiments, it may be unnecessary for the network discovery module 112 to transmit the PVN deployment template 118 to the virtual network deployment component 120. Additionally, and as mentioned above, a PVN deployment template 118 might not be utilized in every implementation.

From operation 210, the routine 200 proceeds to operation 212 where the virtual network deployment component 120 utilizes the PVN deployment template 118 to create the PVN 122 in the service provider network 102. As mentioned above, the PVN 122 may be created such that it has the same or similar configuration as the customer network 106. Once the PVN 122 has been created, the customer might access the PVN 122 in the service provider network 102 utilizing a virtual private network ("VPN"), a direct network connection, through an Internet gateway, or in another manner.

From operation 212, the routine 200 proceeds to operation 214, where the customer might deploy computing resources 104 to the newly created PVN 122. For example, the customer might configure various virtual machine instances for operation on the PVN 122. Other types of computing resources 104 available from the service provider that operates the service provider network 102 might also be configured on the PVN 122 in a similar fashion. From operation 214, the routine 200 proceeds to operation 216, where it ends.

Figure 3:
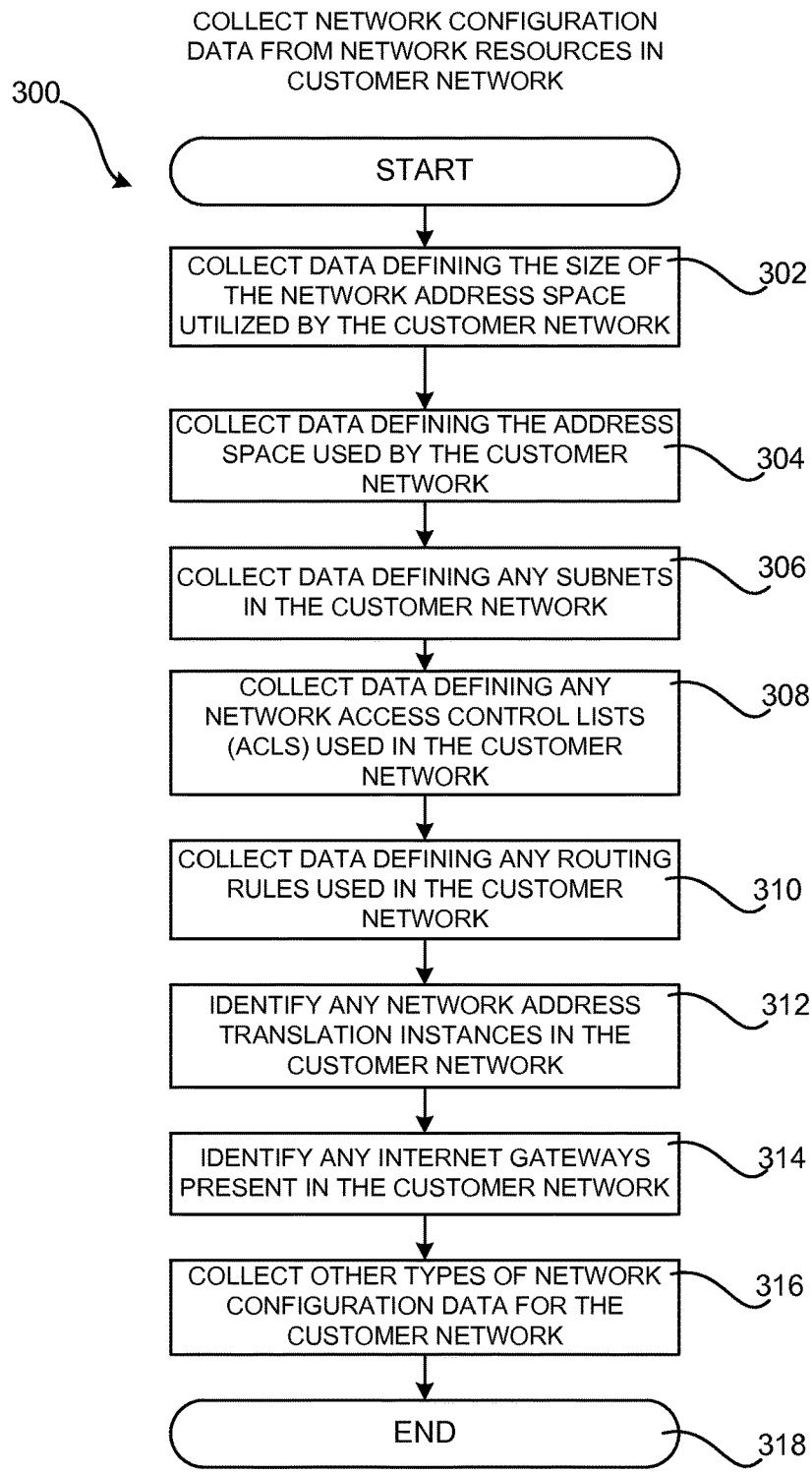
FIG. 3 is a flow diagram showing one illustrative routine for collecting network configuration data from network resources for use in the automated creation of a private virtual network in a service provider network, according to one embodiment disclosed herein.

FIG. 3 is a flow diagram showing one illustrative routine 300 for collecting network configuration data 114 from network resources 108 for use in the automated creation of a PVN 122 in a service provider network 102, according to one embodiment disclosed herein. As mentioned above, the network discovery module 112 might access various management interfaces exposed by the network resources 108A-108C to obtain the network configuration data 114. FIG. 3 illustrates aspects of the various types of network configuration data 114 that might be collected.

The routine 300 begins at operation 302, where the network discovery module 112 collects data from the network resources 108A-108C in the customer network 106 defining the size of the network address space utilized by the customer network 106. The routine 300 then continues to operation 304, where the network discovery module 112 collects data from the network resources 108A-108C in the customer network 106 defining the network address space, such as the actual network addresses defined in the customer network 106.

From operation 304, the routine 300 then proceeds to operation 306, where the network discovery module 112 collects data from the network resources 108A-108C in the customer network 106 defining any subnets in the customer network 106. The routine 300 then proceeds to operation 308, where the network discovery module 112 collects data from the network resources 108A-108C in the customer network 106 defining any network ACLs used in the customer network 106.

From operation 308, the routine 300 then proceeds to operation 310, where the network discovery module 112 collects data from the network resources 108A-108C in the customer network 106 defining any routing rules in use in the customer network 106. The routine 300 then proceeds to operation 312, where the network discovery module 112 collects data from the network resources 108A-108C in the customer network 106 defining any NAT instances in use in the customer network 106. Similarly, at operation 314, the network discovery module 112 collects data from the network resources 108A-108C in the customer network 106 defining any Internet gateways in use in the customer network 106.

The routine 300 then proceeds from operation 316 to operation 318, where the network discovery module 112 may collect other types of network configuration data 114 not specifically mentioned above from the network resources 108A-108C in the customer network 106. In this regard, it should be appreciated that the various types of network configuration data 114 described above are merely illustrative and that other types of network configuration data 114 might be collected and utilized in the manner described herein. From operation 316, the routine 300 proceeds to operation 318, where it ends.

Figure 4:
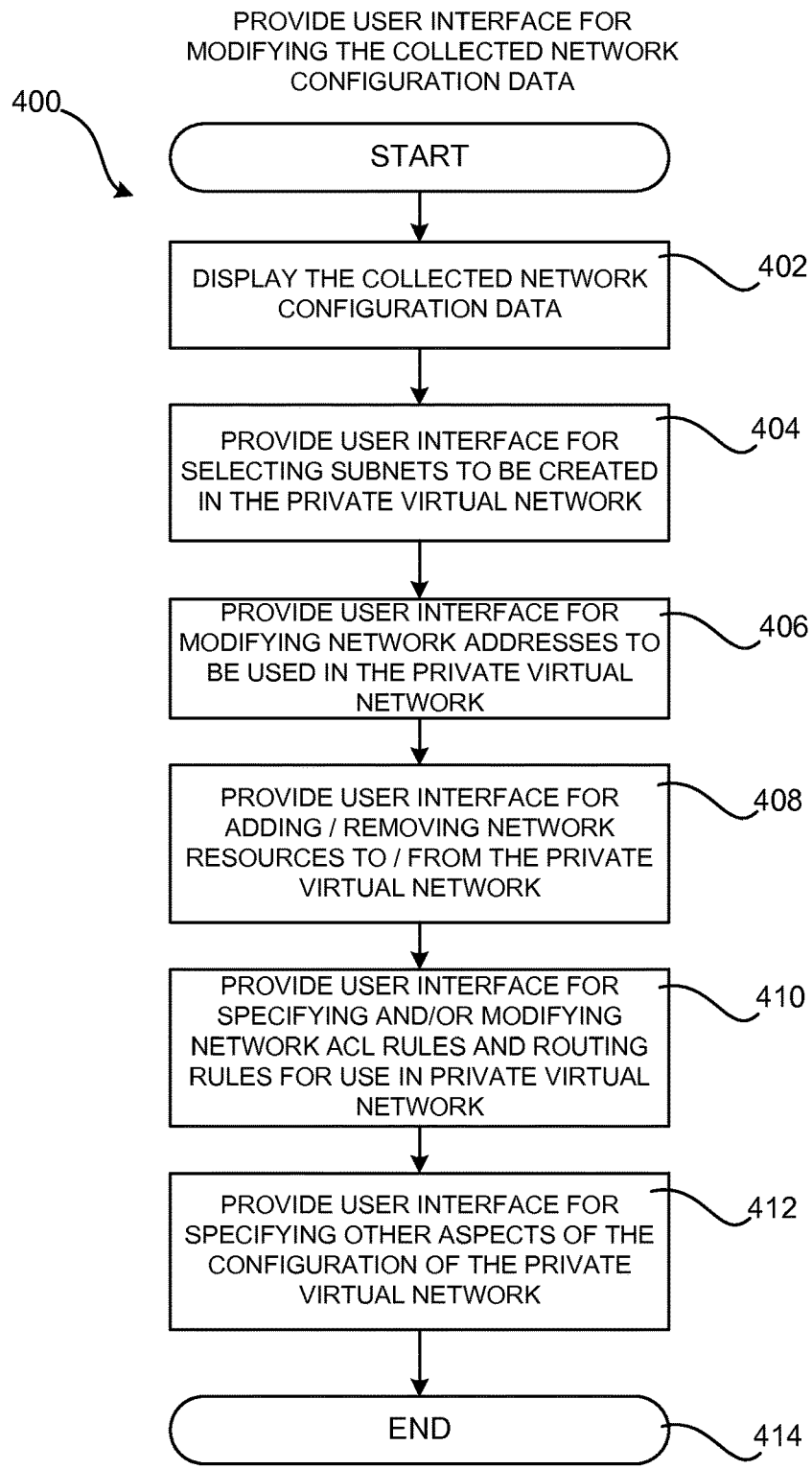
FIG. 4 is a flow diagram showing one illustrative routine for providing a user interface for modifying collected network configuration data collected from network resources, according to one embodiment disclosed herein.

FIG. 4 is a flow diagram showing one illustrative routine 400 for providing a UI for modifying network configuration data 114 collected from network resources 108A-108C in a customer network 106, according to one embodiment disclosed herein. As mentioned briefly above, although a UI is generally described below, other types of interfaces and/or mechanisms might be provided for allowing a user to view and/or modify the collected network configuration data 114.

The routine 400 begins at operation 402, where the collected network configuration data 114 may be displayed. For example, and as described briefly above, a UI might be presented that includes a list of the subnets identified in the customer network 106, the network ACLs used in the customer network, the CIDR ranges used in the customer network 106, any NAT instances or Internet gateway devices in the customer network 106, and other types of network configuration data 114. The routine 400 then proceeds from operation 402 to operation 404.

At operation 404, a UI is presented that allows a user to select a subset or a superset of the identified network resources 108 in the customer network 106 for inclusion in the PVN 122 in the service provider network 102. In particular, the UI might provide functionality for allowing a user to select the subnets that are to be included in the PVN 122 to be created in the service provider network 102. In this way, the user might be permitted to select a subset of the subnets for inclusion in the PVN 122. The UI might also provide functionality for including or excluding other network resources 108 from the PVN 122.

From operation 404, the routine 400 proceeds to operation 406, where a UI is provided that allows a user to modify and/or specify network addresses to be utilized by the PVN 122 in the service provider network 102. As mentioned above, the UI might also be configured in some implementations to provide a recommendation of network addresses for use by the PVN 122 in the service provider network 102. As an example, the UI might recommend network addresses for use by the PVN 122 that do not overlap, or otherwise conflict with, the CIDR range utilized within the customer network 106. It should be appreciated that, in some embodiments, a customer may be permitted to create network addresses for use by the PVN 122 that do overlap with network addresses used within the customer network 106. In these implementations, the customer might utilize a proxy layer or another mechanism to ensure that the overlap is not exposed. This may be useful, for instance, in creating a network topology (including addressing) in a PVN 122 that is identical to the network topology of all or a portion of a customer network 106 for testing and other purposes.

From operation 406, the routine 400 proceeds to operation 408, where a UI is provided for allowing a user to add, delete, and/or modify network resources 108 in the network configuration data 114. For example, the user might be permitted to add, delete, and/or modify NAT instances, firewalls, Internet gateways, load balancing devices, and/or other networking resources 108 in the network configuration data 114. Similarly, at operation 408, a UI may be provided for allowing a user to add, delete, and/or modify network ACLs and/or routing rules specified by the network configuration data 114.

From operation 410, the routine 400 proceeds to operation 412, where a UI might be provided for allowing a user to add, modify, and/or delete other aspects of the configuration of the PVN 122 as specified by the network configuration data 114. In this regard, it should be appreciated that functionality might be provided for allowing a user to specify other operational aspects of the PVN 122 not specifically mentioned above. From operation 412, the routine 400 proceeds to operation 414, where it ends.

It should be appreciated that, in some embodiments, the network discovery module 112 might also be configured with other types of functionality. For example, in one embodiment, the network discovery module 112 is configured to discover firewall rules present in the customer network 106. The firewall rules might be discovered by querying an appropriate management interface on the network resources 108, by "sniffing" packets on the customer network 106, or in another way.

Once one or more firewall rules have been identified, the network discovery module 112 might transmit data identifying the firewall rules to the virtual network deployment component 120, or another component in the service provider network 102. The firewall rules might then be converted in to security group rules for use by computing resources 104 in the PVN 122, such as virtual machine instances. In this way, firewall rules defined in the customer network 106 can be identified and converted into security group rules suitable for use in a VPN 122 in a service provider network 102. In this regard, it should be appreciated that the network discovery module 112 and the other components described above might also be configured with additional functionality not specifically mentioned herein.

Figure 5:
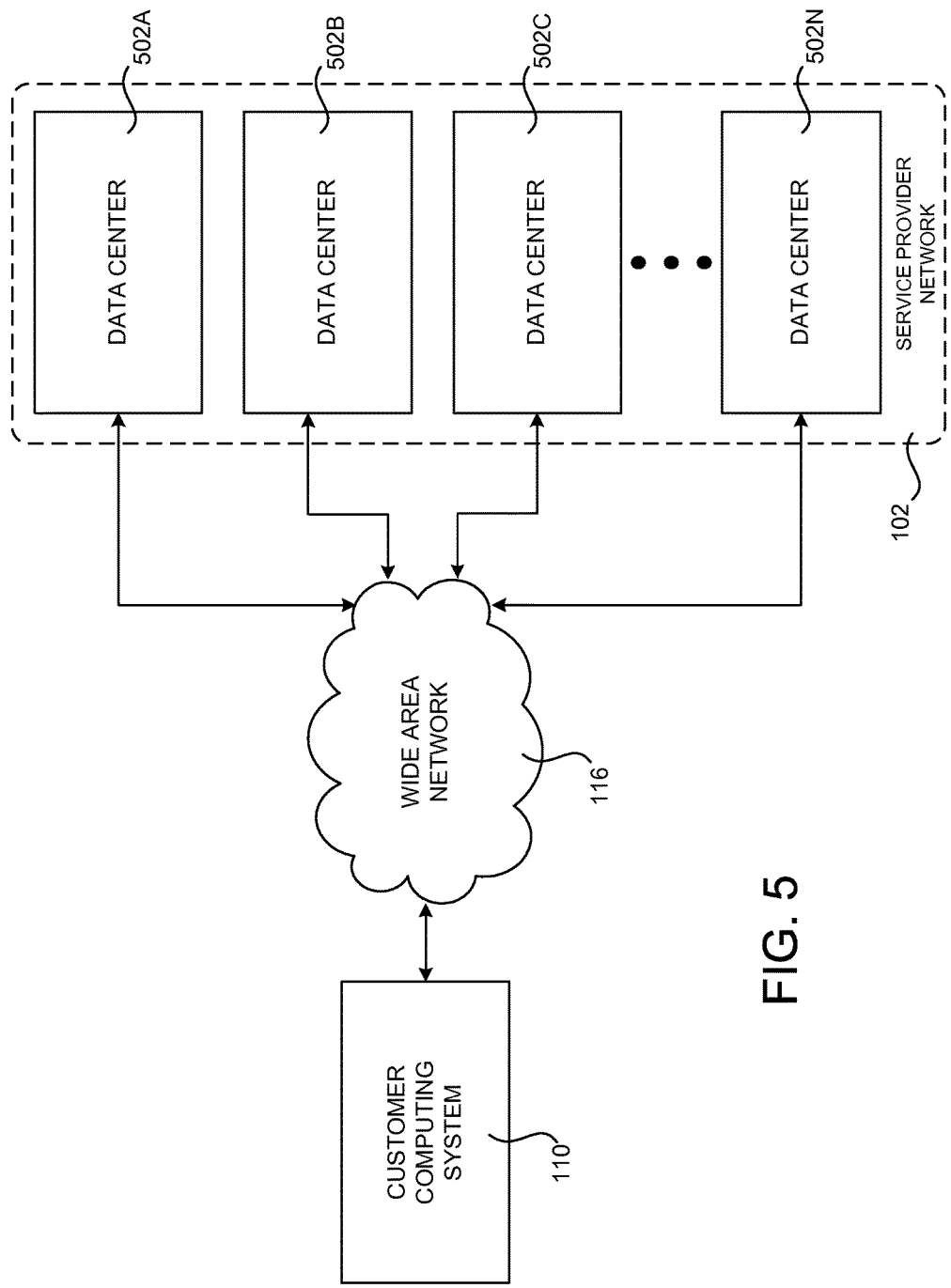
FIG. 5 is a system and network diagram that shows one illustrative operating environment for the embodiments disclosed herein that includes a service provider network that provides functionality for implementing private virtual networks and other types of computing resources, according to one embodiment disclosed herein.

FIG. 5 is a system and network diagram that shows one illustrative operating environment for the embodiments disclosed herein that includes a service provider network 102 that may be configured to provide the functionality described above for automated creation of a PVN 122. As discussed briefly above, the service provider network 102 can provide computing resources 104 on a permanent or an as-needed basis. The computing resources 104 provided by the service provider network 102 may include various types of computing resources 104, such as data processing resources, data storage resources, networking resources, data communication resources, and the like.

Each type of computing resource 104 may be general-purpose or may be available in a number of specific configurations. For example, and as described briefly above, data processing resources may be available as virtual machine instances in a number of different configurations. The virtual machine instances may be configured to execute applications, including Web servers, application servers, media servers, database servers, and other types of applications. Data storage resources may include file storage devices, block storage devices, and the like.

As also mentioned briefly above, the computing resources 104 provided by the service provider network 102 are enabled in one implementation by one or more data centers 502A-502N (which may be referred herein singularly as "a data center 502" or in the plural as "the data centers 502"). The data centers 502 are facilities utilized to house and operate computer systems and associated components. The data centers 502 typically include redundant and backup power, communications, cooling, and security systems. The data centers 502 might also be located in geographically disparate locations. One illustrative configuration for a data center 502 that implements aspects of functionality disclosed herein for automated creation of a PVN 122 in a service provider network 102 will be described below with regard to FIG. 6.

The customers and other users of the service provider network 102 may access the computing resources provided by the service provider network 102 over a WAN 116. Although a WAN 116 is illustrated in FIG. 5, it should be appreciated that a local-area network ("LAN"), the Internet, or any other networking topology known in the art that connects the data centers 502 to remote customers and other users may be utilized. It should also be appreciated that combinations of such networks might also be utilized. A customer may access a PVN 122 utilizing a VPN, a direct network connection, through an Internet gateway, or in another manner.

Figure 6:
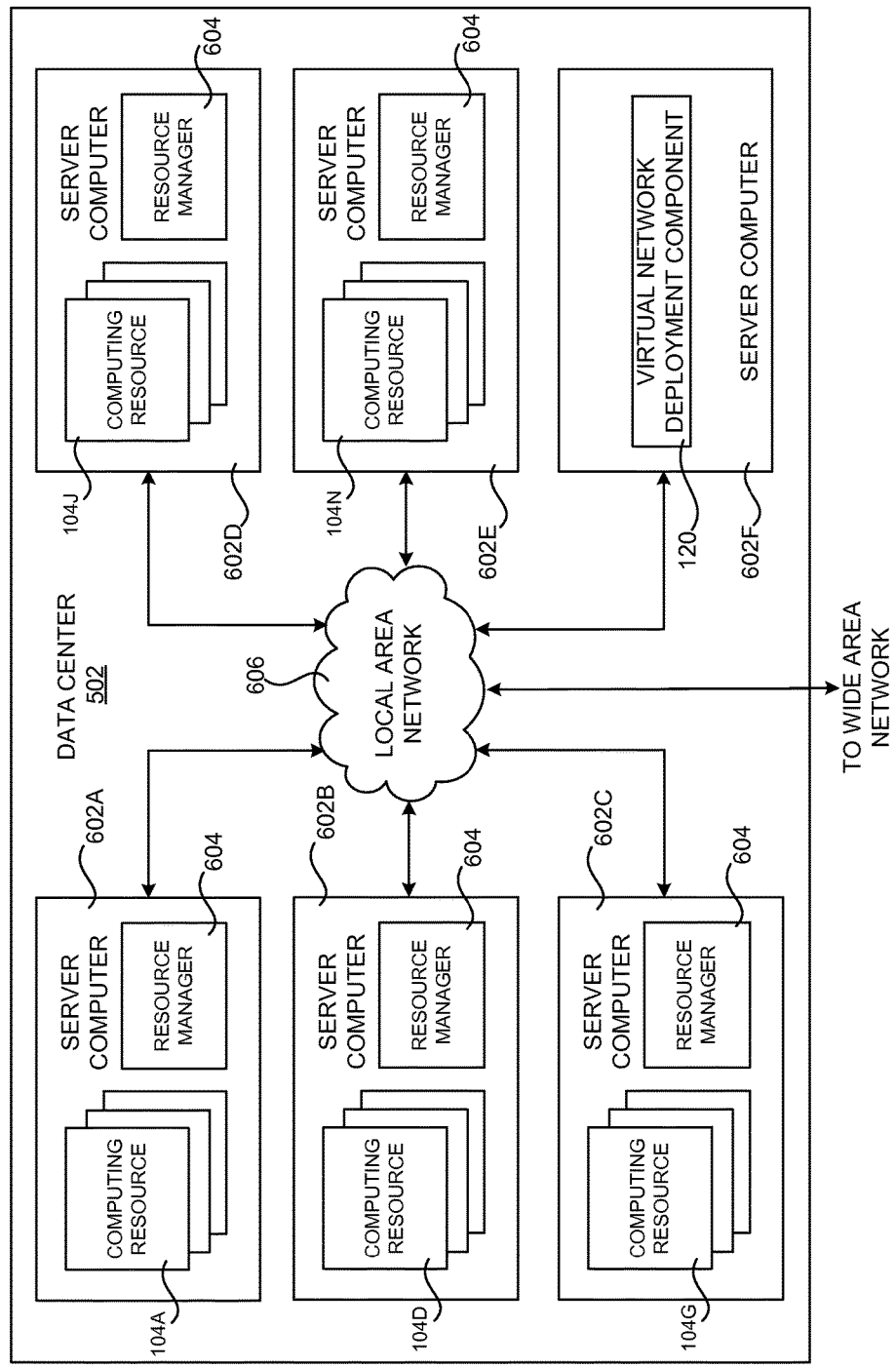
FIG. 6 is a computing system diagram that illustrates one configuration for a data center that implements aspects of the concepts and technologies disclosed herein for automated creation of private virtual networks, according to one embodiment disclosed herein.

FIG. 6 is a computing system diagram that illustrates one configuration for a data center 502 that implements aspects of the concepts and technologies disclosed herein for automated creation of a PVN 122 in a service provider network 102, according to one embodiment disclosed herein. The example data center 502 shown in FIG. 6 includes several server computers 602A-602F (which may be referred herein singularly as "a server computer 602" or in the plural as "the server computers 602") for providing computing resources 104.

The server computers 602 may be standard tower or rack-mount server computers configured appropriately for providing the computing resources described herein. For example, in one implementation the server computers 602 are configured to provide the computing resources 104A-104N. As mentioned above, the computing resources 104 might be data processing resources, data storage resources, database resources, networking resources such as PVNs, and others. Some of the servers 602 might also be configured to execute a resource manager 604 capable of instantiating and/or managing the resources 104. In the case of virtual machine instances, for example, the resource manager 604 might be a hypervisor or another type of program configured to enable the execution of multiple virtual machine instances on a single server computer 602, for example.

The data center 502 shown in FIG. 6 also includes a server computer 602F that may be reserved for executing various software components for managing the operation of the data center 502, the server computers 602, and the computing resources 104. In some embodiments, such as the embodiment described above with regard to FIG. 1, the server computer 602F might also be configured to execute the virtual network deployment component 120. Other computing systems within the data center 502 might also be utilized to execute this component. Other configurations might also be utilized.

In the example data center 502 shown in FIG. 6, an appropriate LAN 606 is utilized to interconnect the server computers 602A-602F. The LAN 606 is also connected to the WAN 116 illustrated in FIG. 5. It should be appreciated that the configuration and network topology illustrated in FIGS. 1-6 has been greatly simplified and that many more computing systems, networks, and networking devices may be utilized to interconnect the various computing systems disclosed herein and to provide the functionality described above. Appropriate load balancing devices or software modules might also be utilized for balancing a load between each of the data centers 502A-502N, between each of the server computers 602A-602F in each data center 502, and, potentially, between computing resources 104 in each of the data centers 502. It should be appreciated that the data center 502 described with respect to FIG. 6 is merely illustrative and that other implementations might be utilized.

Figure 7:
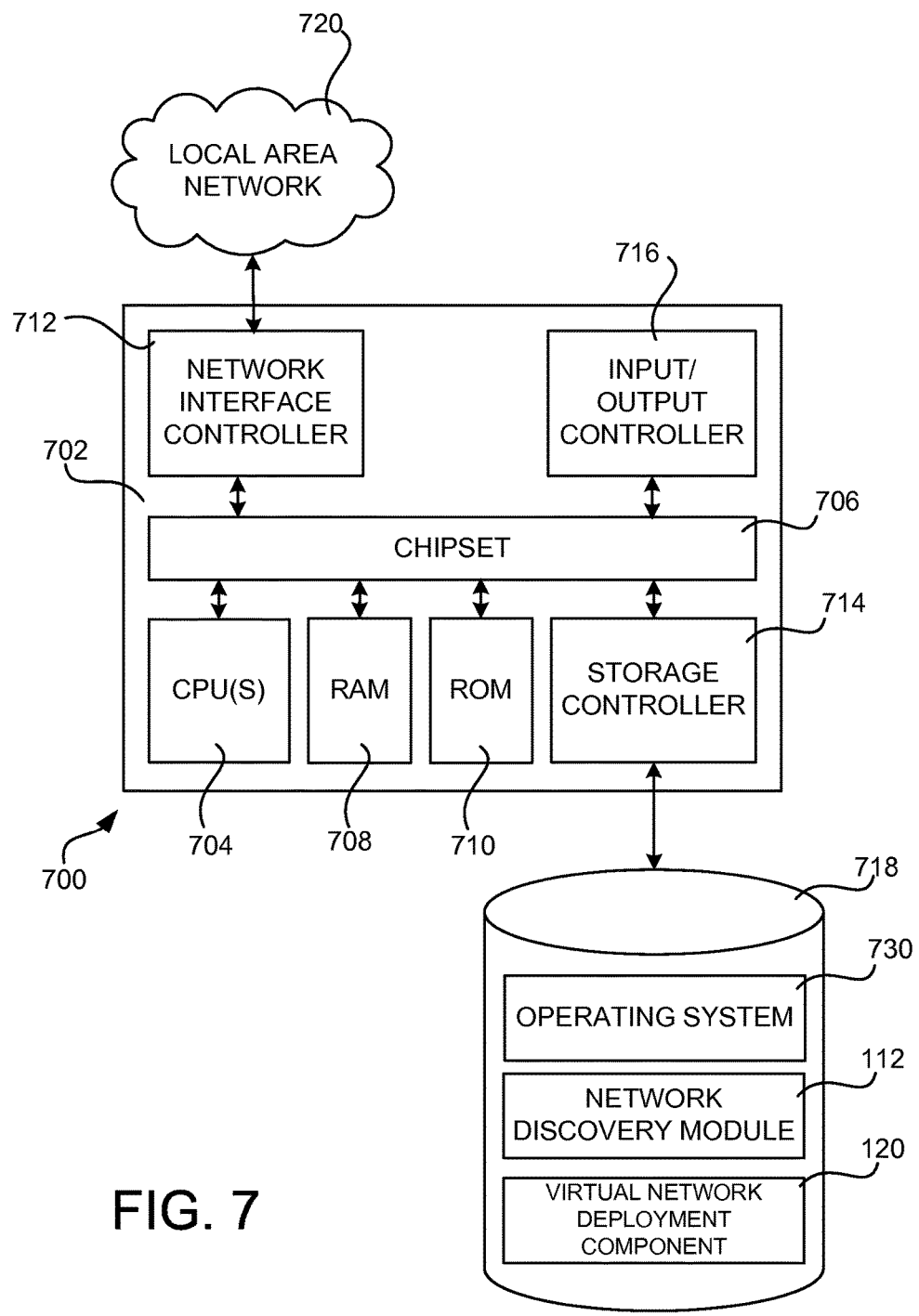
FIG. 7 is a computer architecture diagram showing an illustrative computer hardware architecture for implementing a computing device that might be utilized to implement aspects of the various embodiments presented herein.

FIG. 7 shows an example computer architecture for a computer 700 capable of executing the program components described above for automated deployment of PVNs 122 in a service provider network 102. The computer architecture shown in FIG. 7 illustrates a conventional server computer, workstation, desktop computer, laptop, tablet, network appliance, personal digital assistant ("PDA"), e-reader, digital cellular phone, or other computing device, and may be utilized to execute any aspects of the software components presented herein. For example, the computer architecture shown in FIG. 7 may be utilized to execute the network discovery module 112 or the virtual network deployment component 120 shown in FIG. 1 and described above.

The computer 700 includes a baseboard 702, or "motherboard," which is a printed circuit board to which a multitude of components or devices may be connected by way of a system bus or other electrical communication paths. In one illustrative embodiment, one or more central processing units ("CPUs") 704 operate in conjunction with a chipset 706. The CPUs 704 may be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 may provide an interface to a random access memory ("RAM") 708, used as the main memory in the computer 700. The chipset 706 may further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM may also store other software components necessary for the operation of the computer 700 in accordance with the embodiments described herein.

The computer 700 may operate in a networked environment using logical connections to remote computing devices and computer systems through a network, such as the local area network 720. The chipset 706 may include functionality for providing network connectivity through a NIC 712, such as a gigabit Ethernet adapter. The NIC 712 is capable of connecting the computer 700 to other computing devices over the network 720. It should be appreciated that multiple NICs 712 may be present in the computer 700, connecting the computer to other types of networks and remote computer systems.

The computer 700 may be connected to a mass storage device 718 that provides non-volatile storage for the computer. The mass storage device 718 may store system programs, application programs, other program modules, and data, which have been described in greater detail herein.

The mass storage device 718 may be connected to the computer 700 through a storage controller 714 connected to the chipset 706. The mass storage device 718 may consist of one or more physical storage units. The storage controller 714 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 may store data on the mass storage device 718 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 718 is characterized as primary or secondary storage, and the like.

For example, the computer 700 may store information to the mass storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 may further read information from the mass storage device 718 by detecting the physical states or characteristics of one or more particular locations within the physical storage units.

In addition to the mass storage device 718 described above, the computer 700 may have access to other computer-readable storage media to store and retrieve information, such as program modules, data structures, or other data. It should be appreciated by those skilled in the art that computer-readable storage media can be any available media that provides for the storage of non-transitory data and that may be accessed by the computer 700.

By way of example, computer-readable storage media may include volatile and non-volatile, removable and non-removable media implemented in any method or technology. Computer-readable storage media includes RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The mass storage device 718 may store an operating system 730 utilized to control the operation of the computer 700. According to one embodiment, the operating system comprises the LINUX operating system. According to another embodiment, the operating system comprises the WINDOWS® SERVER operating system from MICROSOFT Corporation. According to further embodiments, the operating system may comprise the UNIX or SOLARIS operating systems. It should be appreciated that other operating systems may also be utilized. The mass storage device 718 may store other system or application programs and data utilized by the computer 700, such as the network discovery module 112, the virtual network deployment component 120, and/or any of the other software components and data described above. The mass storage device 718 might also store other programs and data not specifically identified herein.

In one embodiment, the mass storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various routines described above with regard to FIGS. 2-4. The computer 700 might also include computer-readable storage media for performing any of the other computer-implemented operations described herein.

The computer 700 may also include one or more input/output controllers 716 for receiving and processing input from a number of input devices, such as a keyboard, a mouse, a touchpad, a touch screen, an electronic stylus, or other type of input device. Similarly, the input/output controller 716 may provide output to a display, such as a computer monitor, a flat-panel display, a digital projector, a printer, a plotter, or other type of output device. It will be appreciated that the computer 700 may not include all of the components shown in FIG. 7, may include other components that are not explicitly shown in FIG. 7, or may utilize an architecture completely different than that shown in FIG. 7.

Based on the foregoing, it should be appreciated that technologies for automated creation of PVNs 122 in a service provider network 102 have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereupon which, when executed by a computer, cause the computer to perform a method for automated creation of a private virtual network, the method comprising operations to: collect, at a customer network, network configuration data from a plurality of network resources in the customer network, the network configuration data describing a configuration of the customer network and access control lists indicating permission rights existing in the customer network; receive from a component within a service provider network, a user interface configured based, at least in part, on the collected network configuration data; receive, from one or more other components in one or more networks, a first modification to at least a portion of the collected network configuration data; provide, at the customer network, the user interface configured to: receive a second modification of the collected network configuration data, present a collection of one or more identified network resources in the customer network, provide functionality for receiving a selection of a subset of the one or more identified network resources in the customer network for inclusion in the private virtual network in the service provider network, provide a recommendation of one or more network addresses for use by the private virtual network, wherein the one or more network addresses do not overlap with network addresses used in the customer network, and receive a selection of a network address that is to be used by the private virtual network; create, at the customer network, a virtual network deployment template using the collected network configuration data; and provide the virtual network deployment template to a deployment component at the service provider network configured to utilize the virtual network deployment template to create the private virtual network in the service provider network, the private virtual network having a configuration that is substantially similar to the configuration of the customer network.

2. The computer-readable storage medium of claim 1, wherein the collection of one or more identified network resources includes a plurality of subnets in the customer network, and wherein the user interface is further configured to provide functionality for selecting a subset of the subnets for inclusion in the private virtual network in the service provider network.

3. The computer-readable storage medium of claim 2, wherein the network configuration data further defines network addresses used by the plurality of subnets in the customer network, and wherein the one or more network addresses are identified based at least in part on a Classless Inter-Domain Routing range used in the customer network.

4. A non-transitory computer-readable storage medium having computer-executable instructions stored thereupon which, when executed by a computer, cause the computer to perform a method for automated creation of a private virtual network, the method comprising operations to: communicate with a plurality of network resources connected to a customer network to collect network configuration data from the plurality of network resources that defines a configuration of the customer network and access control lists indicating permission rights existing in the customer network; receive from a component within a service provider network, a user interface configured based, at least in part, on the collected network configuration data; receive, from one or more other components in one or more networks, a first modification to at least a portion of the collected network configuration data; provide, at the customer network, an interface configured to: receive a second modification of the network configuration data, present a collection of one or more identified network resources in the customer network, provide functionality for receiving a selection of a subset of the one or more identified network resources in the customer network for inclusion in the private virtual network in the service provider network, provide a recommendation of one or more network addresses for use by the private virtual network, wherein the one or more network addresses do not overlap with network addresses used in the customer network, and receive a selection of a network address that is to be used by the private virtual network; create, at the customer network, a virtual network deployment template using the collected network configuration data; and transmit, from the customer network, the virtual network deployment template to a deployment component operating in the service provider network, the deployment component configured to utilize the virtual network deployment template to create the private virtual network in the service provider network, the private virtual network having a configuration that is substantially similar to the configuration of the customer network.

5. The computer-readable storage medium of claim 4, wherein the network resources connected to the customer network comprise one or more of a network switch, a network router, a load balancing device, or a network firewall.

6. The computer-readable storage medium of claim 4, wherein the data defining the configuration of the customer network comprises one or more of:
    data defining a first network address space utilized by the customer network,
    data defining one or more subnets in the customer network,
    data defining one or more routing rules existing in the customer network,
    data defining one or more network address translation (NAT) instances existing in the customer network, and
    data defining one or more Internet gateway devices existing in the customer network.

7. The computer-readable storage medium of claim 4, wherein the one or more network addresses are identified based at least in part on a Classless Inter-Domain Routing range used in the customer network.

8. A computer-implemented method for automated creation of a private virtual network, the method comprising performing computer-implemented operations for: operating a computing device on a first network to collect data defining a configuration of the first network from a plurality of network resources operating on the first network and defining access control lists indicating permission rights existing in the first network; receive from a component within a second network, an interface configured based, at least in part, on the collected data; receive, from one or more other components in one or more networks, a first modification to at least a portion of the collected data; providing, at the first network, an interface configured to: receive a second modification of the collected data defining the configuration of the first network, present a collection of one or more identified network resources in the first network, provide functionality for receiving a selection of a subset of the one or more identified network resources in the first network for inclusion in the private virtual network, provide a recommendation of one or more network addresses for use by the private virtual network, wherein the one or more network addresses do not overlap with network addresses used in the first network, and receive a selection of a network address that is to be used by the private virtual network; creating, at the first network, a virtual network deployment template using the collected data defining the configuration of the first network; and transmitting the virtual network deployment template to a second component operating on a second network configured to utilize the virtual network deployment template to create the private virtual network in the second network, the private virtual network having a configuration that is substantially similar to the configuration of the first network.

9. The computer-implemented method of claim 8, wherein the second network comprises a service provider network.

10. The computer-implemented method of claim 9, wherein the first network comprises a network operated by a customer of a service provider that operates the service provider network.

11. The computer-implemented method of claim 8, wherein the plurality of network resources operating on the first network comprise one or more of a network switch, a network router, a load balancing device, or a network firewall.

12. The computer-implemented method of claim 8, wherein the recommendation comprises one or more network addresses for use by subnets in the private virtual network.

13. A system for creating a private virtual network, the system comprising: one or more computers configured to: collect data defining a configuration of a first network from a plurality of network resources operating on the first network, and defining access control lists indicating permission rights existing in the first network, receive from a component within a second network, an interface configured based, at least in part, on the collected data; receive, from one or more other components in one or more networks, a first modification to at least a portion of the collected data; provide, at the first network, the interface configured to: receive a second modification of the collected data, present a collection of one or more identified network resources in the first network, provide functionality for receiving a selection of a subset of the one or more identified network resources in the first network for inclusion in the private virtual network, provide a recommendation of one or more network addresses for use by the private virtual network, wherein the one or more network addresses do not overlap with network addresses used in the first network, and receive a selection of a network address that is to be used by the private virtual network, create, at the first network, a virtual network deployment template using the collected data, and transmit the virtual network deployment template to the second network configured to utilize the virtual network deployment template to create the private virtual network in the second network, the private virtual network having a configuration that is substantially similar to the configuration of the first network.

14. The system of claim 13, wherein the second network comprises a service provider network.

15. The system of claim 14, wherein the first network comprises a network operated by a customer of a service provider that operates the service provider network.

16. The system of claim 15, wherein the plurality of network resources operating on the first network comprise one or more of a network switch, a network router, a load balancing device, or a network firewall.

17. The computer-readable storage medium of claim 1, wherein the virtual network deployment template includes data describing the configuration of the subset of the one or more identified network resources in the customer network.

18. The computer-readable storage medium of claim 1, wherein the user interface is further configured to provide functionality for receiving a selection to remove a particular identified network resource of the subset of the one or more identified network resources so that the particular identified network resource is not included in the private virtual network in the service provider network.

* * * * *